United States Patent
Konishi

(10) Patent No.: US 11,053,638 B2
(45) Date of Patent: Jul. 6, 2021

(54) RECYCLED PULP FIBER MANUFACTURING METHOD

(71) Applicant: Unicharm Corporation, Ehime (JP)

(72) Inventor: Takayoshi Konishi, Kanonji (JP)

(73) Assignee: UNICHARM CORPORATION, Ehime (JP)

(*) Notice: Subject to any disclaimer, the term of this patent is extended or adjusted under 35 U.S.C. 154(b) by 0 days.

(21) Appl. No.: 16/954,648

(22) PCT Filed: Oct. 2, 2018

(86) PCT No.: PCT/JP2018/036911
§ 371 (c)(1),
(2) Date: Jun. 17, 2020

(87) PCT Pub. No.: WO2019/123766
PCT Pub. Date: Jun. 27, 2019

(65) Prior Publication Data
US 2020/0308764 A1  Oct. 1, 2020

(30) Foreign Application Priority Data
Dec. 20, 2017  (JP) .............................. JP2017-244088

(51) Int. Cl.
*D21C 5/02* (2006.01)
*D21B 1/32* (2006.01)
*C08J 11/16* (2006.01)

(52) U.S. Cl.
CPC ............ *D21C 5/022* (2013.01); *C08J 11/16* (2013.01); *D21B 1/32* (2013.01); *D21C 5/02* (2013.01)

(58) Field of Classification Search
CPC ................................. D21C 5/02; D21C 5/022
See application file for complete search history.

(56) References Cited

U.S. PATENT DOCUMENTS 4,740,212 A * 4/1988 Yant .................... D21C 9/12
162/73
2014/0230322 A1  8/2014 Zhang et al.

FOREIGN PATENT DOCUMENTS

EP  3156541 A1  4/2017
JP  H09249711 A  9/1997
(Continued)

OTHER PUBLICATIONS

Smook, Handbook for Pulp and Paper Technologists, 1992, Angus Wilde Publications, 2nd edition, chapter 9 (Year: 1999).*
(Continued)

*Primary Examiner* — Anthony Calandra
(74) *Attorney, Agent, or Firm* — Fredrikson & Byron, P.A.

(57) ABSTRACT

The purpose of the present invention is to provide a recycled pulp fiber manufacturing method with which it is possible to easily obtain recycled pulp fibers containing less of a high water-absorption polymer without requiring any mechanical equipment such as an ozone generation apparatus. This method is for manufacturing recycled pulp fibers from used sanitary goods including pulp fibers and a high water-absorption polymer, and is characterized by comprising: an inactivation step (S1) for immersing a sanitary goods constituent material in an acid-containing aqueous solution so as to inactivate the high water-absorption polymer; a high water-absorption polymer degradation step (S3) for generating chlorine dioxide by adding a chlorine dioxide generating material, which is capable of generating chlorine dioxide through reaction with an acid, to the acid-containing aqueous solution that has undergone the inactivation step (S1), and then degrading the inactivated high water-absorption polymer using said chlorine dioxide; and a recycled pulp fiber recovery step (S4) for recovering the recycled pulp fibers from the acid-containing aqueous solution that has undergone the high water-absorption polymer degradation step (S3).

5 Claims, 3 Drawing Sheets

(56) References Cited

FOREIGN PATENT DOCUMENTS

| | | | |
|---|---|---|---|
| JP | 2001316519 A | 11/2001 | |
| JP | 200339023 A | 2/2003 | |
| JP | 2003190928 A | 7/2003 | |
| JP | 201084031 A | 4/2010 | |
| JP | 2013520244 A | 6/2013 | |
| JP | 2013150976 A | 8/2013 | |
| JP | 2013177282 A | 9/2013 | |
| JP | 2015182246 A | 10/2015 | |
| JP | 2017113736 A | 6/2017 | |
| JP | 201821283 A | 2/2018 | |
| WO | WO-2014168179 A1 * | 10/2014 | ............... D21C 5/02 |
| WO | 2016047294 A1 | 3/2016 | |
| WO | 2016198890 A1 | 12/2016 | |

OTHER PUBLICATIONS

PCT International Search Report dated Dec. 18, 2018 for Intl. App. No. PCT/JP2018/036911, from which the instant application is based, 2 pgs.

English Abstract for Japanese Publication No. 2017-113736 A, published Jun. 29, 2017, 2 pgs.

English Abstract for Japanese Publication No. 2003-190928 A, published Jul. 8, 2003, 2 pgs.

English Abstract and Machine Translation for Japanese Publication No. 2013-150976 A, published Aug. 8, 2013, 35 pgs.

English Abstract and Machine Translation for Japanese Publication No. 2010-084031 A, published Apr. 15, 2010, 15 pgs.

English Abstract and Machine Translation for Japanese Publication No. 2001-316519 A, published Nov. 16, 2001, 16 pgs.

English Abstract for Japanese Publication No. 2013-520244 A, published Jun. 6, 2013, 2 pgs.

English Abstract and Machine Translation for Japanese Publication No. 2003-039023 A, published Dec. 12, 2003, 43 pgs.

English Abstract for Japanese Publication No. 2018-021283 A, published Feb. 8, 2018, 2 pgs.

English Abstract and Machine Translation for Japanese Publication No. JPH09-249711A, published Sep. 22, 1997, 7 pgs.

English Abstract and Machine Translation for Japanese Publication No. JP2013-177282A, published Sep. 9, 2013, 15 pgs.

English Abstract and Machine Translation for Japanese Publication No. JP2015-182246A, published Oct. 22, 2015, 30 pgs.

Extended European Search Report for European Application No. EP18891049.1, dated Dec. 11, 2020, 7 pgs.

* cited by examiner

RECYCLED PULP FIBER MANUFACTURING METHOD

RELATED APPLICATIONS

This application is a 35 U.S.C. 371 national phase filing from International Application No. PCT/JP2018/036911, filed Oct. 2, 2018, which claims priority to Japanese Application No. 2017-244088, filed Dec. 20, 2017, the contents of which are incorporated herein by reference.

FIELD

The present invention relates to a manufacturing method of recycled pulp fibers.

BACKGROUND

Methods of recovering recycled pulp fibers from used sanitary products are known.

For example, Patent Literature 1 discloses a method of recovering pulp fibers from used sanitary products which include pulp fibers and superabsorbent polymers and producing recycled pulp which can be reused as sanitary products, the method comprising: a decomposing step of decomposing the used sanitary products into pulp fibers and other materials by applying a physical force to the used sanitary products in an aqueous solution which includes polyvalent metal ions or an acidic aqueous solution which has a pH of 2.5 or less; a separating step of separating the pulp fibers from a mixture of the pulp fibers and the other materials which are generated in the decomposing step; and a treating step of treating the separated pulp fibers with an ozone containing aqueous solution which has a pH of 2.5 or less.

CITATION LIST

Patent Literature

[PTL 1] Japanese Unexamined Patent Publication No. 2016-881

SUMMARY

Technical Problem

In Patent Literature 1, the superabsorbent polymers are decomposed by using ozone, however, when the superabsorbent polymers are decomposed by using ozone, although recycled pulp fibers in which the amount of superabsorbent polymers is small can be obtained, mechanical equipment such as an ozone generation device, etc., is required.

Accordingly, the object of the present disclosure is to provide a manufacturing method of recycled pulp fibers which does not require mechanical equipment such as an ozone generation device, etc., and by which recycled pulp fibers in which the amount of superabsorbent polymers is small can be obtained easily.

Solution to Problem

The present inventors found out that a method of manufacturing recycled pulp fibers from an used sanitary product which includes pulp fibers and superabsorbent polymers, comprising:

an inactivation step of inactivating the superabsorbent polymers by immersing a sanitary product configurational material which configures the sanitary product and includes the pulp fibers and the superabsorbent polymers with an acid group in an acid containing aqueous solution which includes an acid, a superabsorbent polymer decomposition step of decomposing the inactivated superabsorbent polymers by adding a chlorine dioxide generation material which generates chlorine dioxide by a reaction with an acid to the acid containing aqueous solution which has been subjected to the inactivation step, so as to generate the chlorine dioxide and by using the generated chlorine dioxide, and a recycled pulp fiber recovery step of recovering the recycled pulp fibers from the acid containing aqueous solution which has been subjected to the superabsorbent polymer decomposition step is the solution to the problem.

Advantageous Effects of Invention

According to the manufacturing method of recycled pulp fibers of the present disclosure, mechanical equipment such as an ozone generation device, etc., is not required, and recycled pulp fibers in which the amount of superabsorbent polymers is small can be obtained easily.

DESCRIPTION OF EMBODIMENTS

<Definitions>

"Inactivation" with Regard to Superabsorbent Polymers

Figure 1:
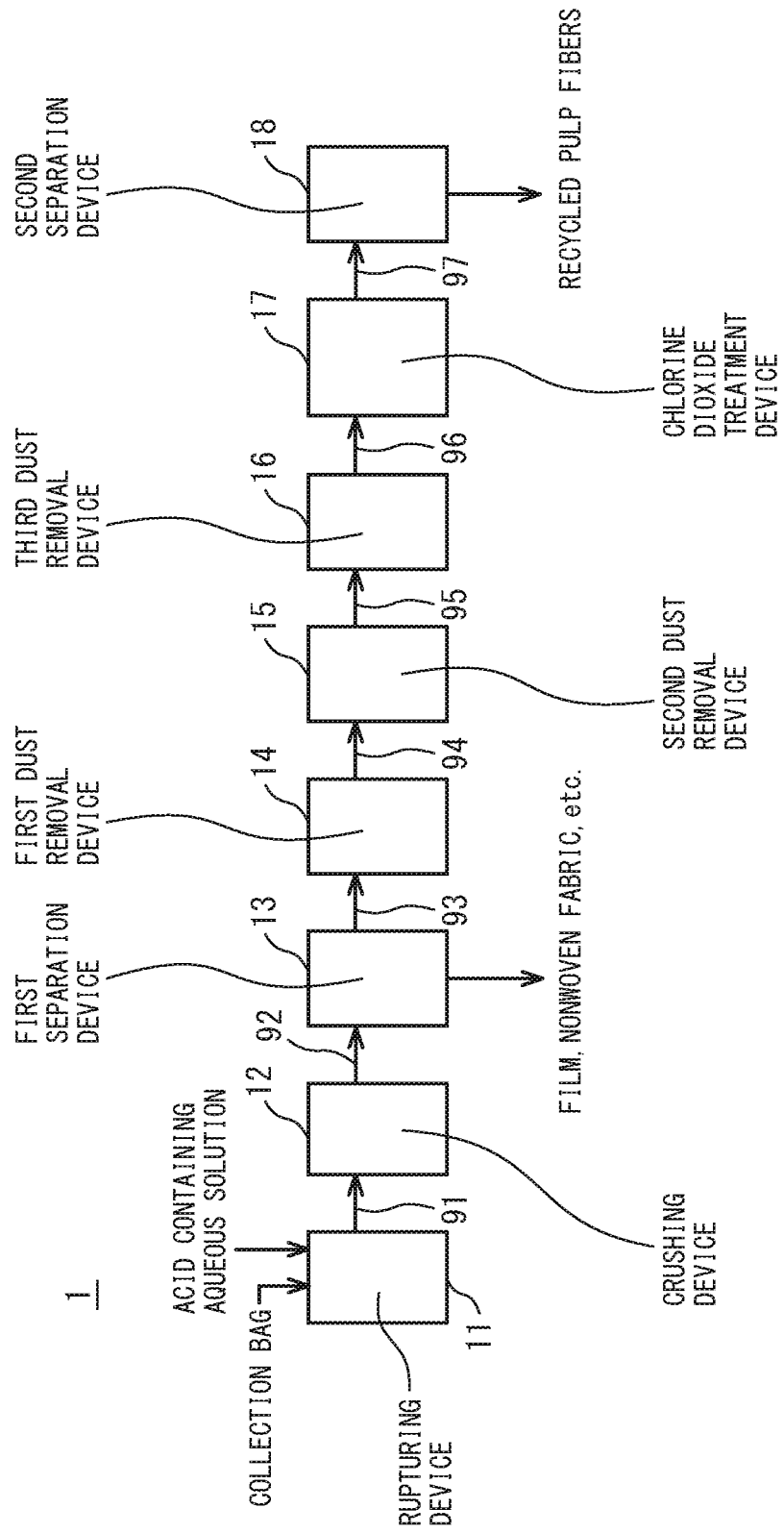
FIG. 1 is a block diagram of the system 1 so as to implement the method according to one embodiment of the present disclosure.

In the present description, "inactivation" with regard to superabsorbent polymers (SAPs) means adjusting the superabsorbent polymers which retain excrement, etc., so as to have an absorption magnification of preferably 50 times or less, more preferably 30 times or less, and even more preferably 25 times or less, for example, letting the superabsorbent polymers release the retained excrement, and suppressing absorption of the an acid containing aqueous solution, etc.

The above-mentioned absorption magnification is measured as follows.
(1) The inactivated superabsorbent polymers are placed in a mesh and are suspended for 5 minutes, whereby moisture which is attached to the surface thereof is removed, and the mass thereof before drying: $m_1$ (g) is measured.
(2) The inactivated superabsorbent polymers are dried at 120° C. for 10 minutes, and the mass thereof after drying: $m_2$ (g) is measured.
(3) The absorption magnification (g/g) is calculated by the following formula.

$$\text{Absorption magnification}(g/g) = m_1/m_2$$

More specifically, the present disclosure relates to the following aspects.

[Aspect 1]

A method of manufacturing recycled pulp fibers from an used sanitary product which includes pulp fibers and superabsorbent polymers, comprising:

an inactivation step of inactivating the superabsorbent polymers by immersing a sanitary product configurational material which configures the sanitary product and includes the pulp fibers and the superabsorbent polymers with an acid group in an acid containing aqueous solution which includes an acid, a superabsorbent polymer decomposition step of decomposing the inactivated superabsorbent polymers by adding a chlorine dioxide generation material which generates chlorine dioxide by a reaction with an acid to the acid containing aqueous solution which has been subjected to the inactivation step, so as to generate the chlorine dioxide and by using the generated chlorine dioxide, and a recycled pulp fiber recovery step of recovering the recycled pulp fibers from the acid containing aqueous solution which has been subjected to the superabsorbent polymer decomposition step.

According to the above-mentioned method, in the inactivation step, the superabsorbent polymers are inactivated by using an acid, and in the superabsorbent polymer decomposition step, the acid and the chlorine dioxide generation material are made to react with each other, whereby chlorine dioxide is generated, and the superabsorbent polymers are decomposed by using the generated chlorine dioxide. Accordingly, for example, in comparison with a case in which the superabsorbent polymers are decomposed by using ozone, mechanical equipment such as an ozone generation device, etc., is not required, and recycled pulp can be obtained easily.

Further, in the superabsorbent polymer decomposition step, an acid is consumed and chlorine dioxide is generated, whereby the pH of the acid containing aqueous solution is to be higher (so as to approximate to neutral) at the end of the superabsorbent polymer decomposition step, and accordingly, in the recycled pulp fiber recovery step, when discarding the acid containing aqueous solution which is separated from the recycled pulp fibers, the amount of the neutralizing agent which neutralizes the acid containing aqueous solution can be reduced, and it is easier to perform wastewater treatment.

[Aspect 2]

The method according to aspect 1, wherein in the inactivation step, a chlorine dioxide generation material which generates chlorine dioxide by a reaction with an acid is added to the acid containing aqueous solution, so as to generate the chlorine dioxide, and the pulp fibers are sterilized by using the generated chlorine dioxide.

According to the above-mentioned method, in the inactivation step, the acid which is present within the acid containing aqueous solution and the chlorine dioxide generation material are made to react with each other, whereby chlorine dioxide is generated, fungi which are brought from the excrement, etc., are sterilized, and the amount of fungi within the acid containing aqueous solution can be reduced (the amount of fungi which are attached to the pulp fibers can be reduced), and accordingly, it is difficult for fungi which derive from used sanitary product to remain in the recycled pulp fibers to be manufactured.

[Aspect 3]

The method according to aspect 2, wherein in the inactivation step, the chlorine dioxide which has a concentration lower than a concentration of the chlorine dioxide in the superabsorbent polymer decomposition step is generated.

According to the above-mentioned method, in the inactivation step, chlorine dioxide which has a concentration lower than the concentration of the chlorine dioxide in the superabsorbent polymer decomposition step is generated in the acid containing aqueous solution which includes the pulp fibers and the superabsorbent polymers with an acid group, whereby in the inactivation step, while suppressing the decomposition of the superabsorbent polymers, the amount of fungi within the acid containing aqueous solution can be reduced (the amount of fungi which are attached to the pulp fibers can be reduced).

Further, in a case in which the sanitary product configurational material includes the non-specified material which will be described later, chlorine dioxide can be suppressed from being consumed for oxidizing the non-specified material.

[Aspect 4]

The method according to aspect 3, wherein in the inactivation step, the acid containing aqueous solution is retained at a temperature of 5 to 30° C.

According to the above-mentioned method, the temperature of the acid containing aqueous solution in the inactivation step is retained at a predetermined temperature, whereby chlorine dioxide which generates from the chlorine dioxide generation material can sterilize fungi which derive from the excrement, etc., and before the acid inactivates the superabsorbent polymers, the acid can be suppressed from reacting with the chlorine dioxide generation material so as to be consumed and chlorine dioxide can be suppressed from decomposing the superabsorbent polymers.

[Aspect 5]

The method according to aspect 3 or 4, wherein in the superabsorbent polymer decomposition step, the acid containing aqueous solution is retained at a temperature of 40° C. or higher and lower than 100° C.

According to the above-mentioned method, the temperature of the acid containing aqueous solution in the superabsorbent polymer decomposition step is retained at a predetermined temperature, whereby it is easier for chlorine dioxide to be generated from the chlorine dioxide generation material, and the free radical portion of the chlorine dioxide is activated by heat so that the oxidizing power of the chlorine dioxide is improved. As a result, in comparison with the case in which the temperature of the acid containing aqueous solution is retained at the room temperature, the time to decompose the superabsorbent polymers can be shortened. Further, in comparison with the case in which the superabsorbent polymers are decomposed by using ozone, the concentration of chlorine dioxide can be easily adjusted without using complicated equipment, etc., and further, the sterilization and the decomposition by chlorine dioxide can be controlled easily.

[Aspect 6]

The method according to any one of aspects 1 to 5, wherein the sanitary product configurational material is the sanitary product, and the method further comprises a removal step of removing the sanitary product configurational material except the pulp fibers and the superabsorbent polymers, after the inactivation step and before the superabsorbent polymer decomposition step.

The above-mentioned method further comprises a removal step of removing the sanitary product configurational material except the pulp fibers and the superabsorbent polymers, after the inactivation step and before the superabsorbent polymer decomposition step, whereby the chlorine dioxide can oxidize the superabsorbent polymers efficiently, and decompose the superabsorbent polymers efficiently.

Hereinbelow, the manufacturing method of recycled pulp fibers according to the present disclosure is explained in detail.

The method of manufacturing recycled pulp fibers from used sanitary product hick include pulp fibers and superabsorbent polymers according to the present disclosure (hereinbelow, which may be referred to as "the manufacturing method of recycled pulp fibers", "the manufacturing method of the present disclosure", etc.), includes the following steps:

an inactivation step of inactivating the superabsorbent polymers by immersing a sanitary product configurational material which configures the sanitary product and includes the pulp fibers and the superabsorbent polymers with an acid group in an acid containing aqueous solution which includes an acid, so as to inactivate the superabsorbent polymers (hereinbelow, which may be referred to as "an inactivation step"), a superabsorbent polymer decomposition step of decomposing the inactivated superabsorbent polymers by adding a chlorine dioxide generation material which generates chlorine dioxide by a reaction with an acid to the acid containing aqueous solution which has been subjected to the inactivation step, so as to generate the chlorine dioxide and by using the generated chlorine dioxide (hereinbelow, which may be referred to as "a superabsorbent polymer decomposition step"), and a recycled pulp fiber recovery step of recovering the recycled pulp fibers from the acid containing aqueous solution which has been subjected to the superabsorbent polymer decomposition step (hereinbelow, which may be referred to as "a recycled pulp fiber recovery step").

<The Inactivation Step>

In the inactivation step, a sanitary product configurational material which includes the pulp fibers and the superabsorbent polymers with an acid group in an acid containing aqueous solution which includes an acid, so as to inactivate the superabsorbent polymers.

As the above-mentioned acid, although not particularly limited, for example, an inorganic acid and an organic acid may be mentioned. When superabsorbent polymers are inactivated by using an acid, in comparison with a case in which superabsorbent polymers are inactivated by using lime, calcium chloride, magnesium sulfate, magnesium chloride, aluminum sulfate, aluminum chloride, etc., it is difficult for ash to remain in the pulp fibers, which is preferable.

As the above-mentioned inorganic acid, for example, sulfuric acid, hydrochloric acid, and nitric acid may be mentioned, and the above-mentioned inorganic acid is preferably sulfuric acid from the viewpoint of not including chlorine, and of cost, etc. As the above-mentioned organic acid, those which include an acid group, for example, a carboxyl group, a sulfo group, etc., may be mentioned. Incidentally, an organic acid which includes a sulfo group is referred to as a sulfonic acid, and an organic acid which includes a carboxyl group and does not include a sulfo group is referred to as a carboxylic acid. The above-mentioned organic acid is preferably an organic acid which includes a carboxyl group, especially, a carboxylic acid, from the viewpoint of protecting the equipment.

In a case in which the above-mentioned organic acid includes a carboxyl group, the above-mentioned organic acid may include one or a plurality of carboxyl groups per one molecule, and preferably includes a plurality of carboxyl groups per one molecule. Accordingly, it is easier for the organic acid to form chelate complexes with divalent or higher valent metals included in excrement, etc., such as calcium, whereby it is easier to lower the ash of recycled pulp fibers to be manufactured from used sanitary products.

As the above-mentioned organic acid, for example, citric acid, tartaric acid, malic acid, succinic acid, oxalic acid (the aforementioned being carboxylic acids with a plurality of carboxyl groups), gluconic acid (C6), pentanoic acid (C5), butanoic acid (C4), propionic acid (C3), glycolic acid (C2), acetic acid (C2), for example, glacial acetic acid, formic acid (C1) (the aforementioned being carboxylic acids with one carboxyl group), methanesulfonic acid, trifluoromethanesulfonic acid, benzenesulfonic acid, p-toluenesulfone acid (the aforementioned being sulfonic acids), etc., may be mentioned.

The above-mentioned acid containing aqueous solution preferably has a predetermined pH, and the predetermined pH is preferably 4.5 or lower, more preferably 4.0 or lower, still more preferably 3.5 or lower, and still even more preferably 3.0 or lower. When the above-mentioned predetermined pH is too high, there may be cases in which the inactivation of the superabsorbent polymers is not sufficiently performed, and in the subsequent superabsorbent polymer decomposition step, it is difficult to decompose the superabsorbent polymers.

Further, the above-mentioned predetermined pH is preferably 0.5 or higher, and more preferably 1.0 or higher. When the above-mentioned predetermined pH is too low, there may be cases in which the recycled pulp fibers are damaged.

Incidentally, the above-mentioned predetermined pH means the value at 25° C. The above-mentioned predetermined pH can be measured by using, for example, twin pH meter AS-711 manufactured by Horiba, Ltd.

In the manufacturing method of the present disclosure, it is preferable that the acid containing aqueous solution satisfies the above-mentioned predetermined pH at least at the time of the initiation of the superabsorbent polymer inactivation step, for example, when immersing the sanitary product configurational material in the acid containing aqueous solution. This is for the purpose of inactivating the superabsorbent polymers, and when the inactivation of the superabsorbent polymers is not sufficiently performed, there may be cases in which the inactivation of the superabsorbent polymers is not sufficiently performed, whereby in the subsequent superabsorbent polymer decomposition step, it is difficult to decompose the superabsorbent polymers.

In the manufacturing method of the present disclosure, it is preferable that the above-mentioned pH is satisfied at the time of termination of the superabsorbent polymer inactivation step. This is from the viewpoint of the continuing the inactivation of the superabsorbent polymers.

The above-mentioned superabsorbent polymers are not particularly limited as long as they are used as superabsorbent polymers which include an acid group, in the technical field, and for example, those which include a carboxyl group, a sulfo group, etc., may be mentioned, and are preferably those which include a carboxyl group.

As the superabsorbent polymers which include a carboxyl group, for example, those of polyacrylic acid based and polymaleic anhydride based may be mentioned, and as the superabsorbent polymers which include a sulfo group, those of polysulfonic acid based may be mentioned.

The above-mentioned pulp fibers are not particularly limited as long as they may be included in a sanitary product.

Incidentally, it is preferable that the acid for inactivating the superabsorbent polymers have an acid dissociation constant ($pk_a$, underwater) which is smaller than the acid dissociation constant ($pk_a$, underwater) of the acid group included in the superabsorbent polymers, so that the superabsorbent polymers are efficiently inactivated.

In a case in which the above-mentioned acid has a plurality of acid groups, for example, in a case in which the above-mentioned acid is a dibasic acid or a tribasic acid, it is preferable that the largest acid dissociation constant ($pk_a$, underwater) among the acid dissociation constants ($pk_a$, underwater) of the above-mentioned acid is smaller than the acid dissociation constant ($pk_a$, underwater) of the acid group included in the superabsorbent polymers, and in a case in which the superabsorbent polymers include a plurality of types of acid groups, it is preferable that the largest acid dissociation constant ($pk_a$, underwater) among the acid dissociation constants ($pk_a$, underwater) of the above-mentioned acid is smaller than the smallest acid dissociation constant ($pk_a$, underwater) among the plurality of types of the acid groups of the superabsorbent polymers. This is from the viewpoint of the inactivation efficiency of the superabsorbent polymers.

In the present description, as the acid dissociation constant ($pk_a$, underwater), the value described in Electrochemistry Handbook edited by The Institute of Electrochemistry can be adopted.

According to the Electrochemistry Handbook, the acid dissociation constant ($pk_a$, underwater, 25° C.) of the major compounds are as follows.

[Organic Acid]
tartaric acid: 2.99 ($pK_{a1}$), 4.44 ($pK_{a2}$)
malic acid: 3.24 ($pK_{a1}$), 4.71 ($pK_{a2}$)
citric acid: 2.87 ($pK_{a1}$), 4.35 ($pK_{a2}$), 5.69 ($pK_{a3}$)
[Inorganic Acid]
sulfuric acid: 1.99

The acid dissociation constant ($pk_a$, underwater) of the acids which is not described in the Electrochemistry Handbook can be obtained by measurement. As the device which is capable of measuring the acid dissociation constant ($pk_a$, underwater) of acids, for example, Compound physical property analysis system, T3, manufactured by Sirius Co., Ltd, may be mentioned.

In the manufacturing method of the present disclosure, the concrete procedure is not particularly limited as long as the sanitary product configurational material can be immersed in an acid containing aqueous solution, and for example, the sanitary product configurational material may be thrown into a tank which includes the acid containing aqueous solution, or the acid containing aqueous solution may be thrown into a tank in which the sanitary product configurational material is disposed.

The above-mentioned sanitary product is not particularly limited as long as it includes pulp fibers and superabsorbent polymers, and for example, as such a sanitary product, a disposable diaper, a disposable shorts, a sanitary napkin, a panty liner, a urine collection pad, a bed sheet, a pet sheet, etc., may be mentioned.

As the above-mentioned sanitary products, for example, those which include a liquid permeable sheet, a liquid impermeable sheet, and an absorbent body (an absorbent core and a core wrap) placed therebetween may be exemplified.

In the manufacturing method of the present disclosure, the sanitary product configurational material in the inactivation step may be mixed matter of pulp fibers and superabsorbent polymers, for example, an absorbent core which is extracted from an used sanitary product. Further, the sanitary product configurational material may be a sanitary product itself.

In a case in which the sanitary product configurational material which is to be immersed in the acid containing aqueous solution includes, in addition to the pulp fibers and superabsorbent polymers (hereinbelow, which may be referred to as "a specified material"), additional materials (hereinbelow, which may be referred to as "a non-specified material"), for example, a liquid permeable sheet, a liquid impermeable sheet, etc., for example, in a case in which the sanitary product itself is immersed in the acid containing aqueous solution as the sanitary product configurational material, the method may further comprise a removal step of removing the non-specified material, after the inactivation step and before the superabsorbent polymer decomposition step (hereinbelow, which may be referred to as "a removal step"). Accordingly, the chlorine dioxide can suppress the non-specified material from being decomposed, and can decompose the superabsorbent polymers efficiently.

Incidentally, in the above-mentioned removal step, the entire non-specified material may be removed, or a portion of the non-specified material may be removed.

The specific example of the above-mentioned removal step is explained later in connection with the system 1 shown in FIG. 1 and the flowchart shown in FIG. 3.

In the manufacturing method of the present disclosure, in the inactivation step, the chlorine dioxide generation material is added to the acid containing aqueous solution, and the chlorine dioxide generation material and acid are made to react with each other, whereby chlorine dioxide is generated, and the above-mentioned pulp fibers can be sterilized by using the generated chlorine dioxide. Accordingly, in the inactivation step, the amount of fungi within the acid containing aqueous solution can be reduced (the amount of fungi which are attached to the pulp fibers can be reduced), and accordingly, it is difficult for fungi which derive from excrement included in an used sanitary product to remain in the recycled pulp fibers to be manufactured.

In the manufacturing method of the present disclosure, in the inactivation step, in a case in which the chlorine dioxide generation material is added to the acid containing aqueous solution, it is preferable that in the inactivation step, chlorine dioxide which has a concentration lower than the concentration of the chlorine dioxide in the superabsorbent polymer decomposition step is made to be generated in the acid containing aqueous solution. Accordingly, in the inactivation step, while suppressing the decomposition of the superabsorbent polymers, the amount of fungi within the acid containing aqueous solution can be reduced (the amount of fungi which are attached to the pulp fibers can be reduced). Further, in a case in which the sanitary product configurational material includes the non-specified material, chlorine dioxide can be suppressed from being consumed for oxidizing the non-specified material.

The concentration (the amount) of chlorine dioxide necessary for sterilizing the acid containing aqueous solution is lower (smaller) than the concentration (the amount) of chlorine dioxide for oxidizing and decomposing the superabsorbent polymers, and since there is a tendency that pH of the acid containing aqueous solution rises by making the chlorine dioxide generation material and an acid react with each other, it is preferable that the above-mentioned concentration relationship (amount relationship) is satisfied.

In the inactivation step, for example, the sanitary product configurational material may be stirred for approximately 5 to 60 minutes, although depending on the temperature, in an inactivation tank which includes the acid containing aqueous solution, whereby the superabsorbent polymers can be inactivated.

The temperature of the acid containing aqueous solution in the inactivation step is not particularly limited, and for example, may be the room temperature (25° C.), or may be higher than the room temperature.

To be specific, in the inactivation step, in a case in which the chlorine dioxide generation material is not added to the acid containing aqueous solution, the temperature of the acid containing aqueous solution in the inactivation step is preferably higher than the room temperature, more preferably 60 to 100° C., still more preferably 70 to 95° C., and even more preferably 80 to 90° C. Accordingly, by the acid which is included in the acid containing aqueous solution, it is easier to sterilize the fungi which derive from excrement, etc., included in the acid containing aqueous solution.

In the inactivation step, in a case in which the chlorine dioxide generation material is added to the acid containing aqueous solution, the temperature of the acid containing aqueous solution in the inactivation step is preferably a low temperature, more preferably 5 to 30° C., still more preferably 10 to 25° C., and even more preferably 15 to 2.0° C. Accordingly, chlorine dioxide which generates from the chlorine dioxide generation material can sterilize the fungi which derive from excrement, etc., included in the acid containing aqueous solution, and further, before the acid inactivates the superabsorbent polymers, the acid can be suppressed from reacting with the chlorine dioxide generation material so as to be consumed and chlorine dioxide can be suppressed from decomposing the superabsorbent polymers.

<The Superabsorbent Polymer Decomposition Step>

In the superabsorbent polymer decomposition step, the inactivated superabsorbent polymers are decomposed by adding a chlorine dioxide generation material which generates chlorine dioxide by a reaction with an acid to the acid containing aqueous solution which has been subjected to the inactivation step, so as to generate the chlorine dioxide and by using the generated chlorine dioxide, As the chlorine dioxide generation material which generates chlorine dioxide by a reaction with an acid, for example, chlorites, such as alkali metal salts of chlorites, such as sodium chlorite, potassium chlorite, lithium chlorite, etc., may be mentioned.

In the superabsorbent polymer decomposition step, the above-mentioned chlorine dioxide generation material may be directly added to the acid containing aqueous solution which includes the sanitary product configurational material in which pulp fibers and inactivated superabsorbent polymers are included. The adding amount of the chlorine dioxide generation material to be added to the acid containing aqueous solution is not particularly limited, and the more the above-mentioned adding amount, there is a tendency that the time required to decompose the superabsorbent polymers is to be shortened, and the less the above-mentioned adding amount, there is a tendency that the time required to decompose the superabsorbent polymers is to be longer. As a guide, for example, the above-mentioned chlorine dioxide generation material is added by the mass ratio of preferably 0.1 to 100 times, more preferably 1.0 to 50 times, and still more preferably 3.0 to 30 times of the superabsorbent polymers (the dry mass) included in the acid containing aqueous solution.

Incidentally, the above-mentioned dry mass means the mass of superabsorbent polymers after being dried at 70° C. for 24 hours.

The above-mentioned chlorine dioxide generation material may be added all at once, may be added continuously, or may be added intermittently, for example a predetermined amount may be added every hour. For example, 20% of the entire amount of the above-mentioned chlorine dioxide generation material may be added to the acid containing aqueous solution every hour by being divided into a total of 5 times.

In the superabsorbent polymer decomposition step, the acid containing aqueous solution is retained at a high temperature, and a temperature of preferably 40° C. or higher and lower than 100° C., more preferably 50° C. to 95° C., and still more preferably 60° C. to 90° C. Accordingly, it is easier for chlorine dioxide to be generated from the chlorine dioxide generation material, and the free radical portion of the chlorine dioxide is activated by heat so that the oxidizing power of the chlorine dioxide is improved, and the time to decompose the superabsorbent polymers can be shortened.

The time of the superabsorbent polymer decomposition step may vary depending on the temperature of the acid containing aqueous solution, the amount of the chlorine dioxide generation material to be added, and the quality of the recycled pulp fibers to be manufactured, etc., however, the superabsorbent polymer decomposition step may be performed preferably for 0.5 to 10 hours, more preferably for 1 to 7 hours, and still more preferably for 2 to 5 hours.

In the manufacturing method of the present disclosure, in the inactivation step, in a case in which the sanitary product configurational material to be immersed in the acid containing aqueous solution includes a non-specified material, and the manufacturing method of the present disclosure further includes the removal step, it is preferable that after the removal step, the temperature of the acid containing aqueous solution is set to be the above-mentioned high temperature. Accordingly, chlorine dioxide reacts on the superabsorbent polymers efficiently, and the superabsorbent polymers can be decomposed efficiently.

In the superabsorbent polymer decomposition step, in order to retain the state in which the superabsorbent polymers are inactivated, at least at the time of the initiation of this step, the above-mentioned predetermined pH, that is, preferably 4.5 or lower, more preferably 4.0 or lower, still more preferably 3.5 or lower, and still even more preferably 3.0 or lower, is set, and preferably 0.5 or higher, and more preferably 1.0 or higher, is set.

<The Recycled Pulp Fiber Recovery Step>

In the recycled pulp fiber recovery step, the recycled pulp fibers are recovered from the acid containing aqueous solution which has been subjected to the superabsorbent polymer decomposition step.

The recovery of the recycled pulp fibers may use any devices without being particularly limited, as long as they are capable of solid-liquid separation, and as the devices capable of solid-liquid separation, for example, a rotary drum screen, a tilted screen, a vibration screen, etc., may be mentioned.

FIG. 1 is a block diagram of the system 1 so as to implement the manufacturing method according to one embodiment of the present disclosure. FIG. 1 is a diagram for explaining the manufacturing method according to one embodiment of the present disclosure, and does not limit the present disclosure in any way.

The system 1 includes the rupturing device 11, the crushing device 12, the first separation device 13, the first dust removal device 14, the second dust removal device 15, the third dust removal device 16, the chlorine dioxide treatment device 17, and the second separation device 18.

Figure 2:
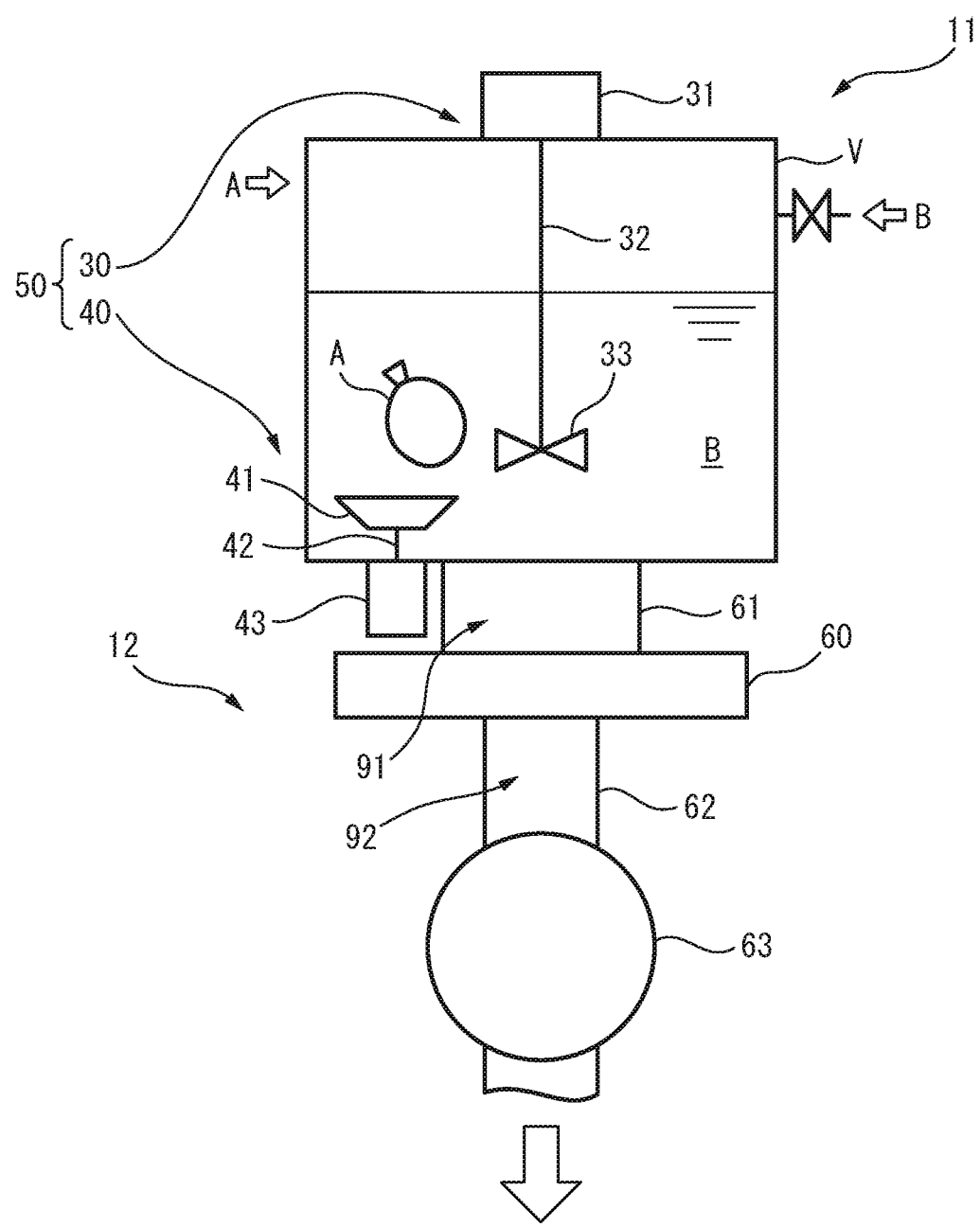
FIG. 2 is a schematic view which shows a configurational example of the rupturing device 11 and the crushing device 12 of FIG. 1.

The rupturing device 11 is filled with the acid containing aqueous solution, and within the acid containing aqueous solution, a hole portion is formed in the collection bag which includes used sanitary products. The crushing device 12 crushes the used sanitary products that have sunk below the surface of the acid containing aqueous solution together with the collection bag. FIG. 2 is a schematic diagram which shows a configuration example of the rupturing device 11 and the crushing device 12 of FIG. 1.

The rupturing device 11 is filled with an acid containing aqueous solution B, and a hole portion is formed in the collection bag A that has sunk in the acid containing aqueous solution B, so as to form the collection bag with a hole portion including used sanitary products 91. The rupturing device 11 includes the solution tank V and the hole formation portion 50. The solution tank V stores the acid containing aqueous solution B. The hole formation portion 50 is provided in the solution tank V, and when the collection bag A is put into the solution tank V, the hole formation portion 50 forms the hole portion on the surface of the collection bag A in contact with the acid containing aqueous solution B.

The hole formation portion 50 includes a feeding portion 30 and a rupturing portion 40. The feeding portion 30 feeds (physically forces) the collection bag A into the acid containing aqueous solution B in the solution tank V. As the feeding portion 30, for example, a stirring machine may be mentioned, and includes the stirring blade 33, the supporting shaft (the rotation shaft) 32 which supports the stirring blade 33, and the driving device 31 which rotates along the shaft of the supporting shaft 32. The stirring blade 33 rotates around the rotation shaft (supporting shaft) 32 by the driving device 31, whereby causes a swirling flow in the acid containing aqueous solution B. The feeding portion 30 draws the collection bag A toward the bottom portion direction of the acid containing aqueous solution B (solution tank V) by the swirling flow.

The rupturing portion 40 is disposed at the lower portion (preferably at the bottom portion) of the solution tank V, and includes the rupturing bag blade 41, the supporting shaft (the rotation shaft) 42 which supports the rupturing bag blade 41, and the driving device 43 which rotates along the shaft of the supporting shaft 42. The rupturing bag blade 41 rotates around the rotation shaft (supporting shaft) 42 by the driving device 43, whereby forms the hole portion in the collection bag A that has moved to the lower portion of the acid containing aqueous solution B (solution tank V).

The crushing device 12 crushes the used sanitary products in the collection bag A which have sunk under the water surface of the acid containing aqueous solution B together with the collection bag A. The crushing device 12 includes the crushing portion 60 and the pump 63. The crushing portion 60 is connected to the solution tank V through the pipe 61, and crushes the collection bag with a hole portion including used sanitary products 91 discharged from the solution tank V, together with the collection bag A, in the acid containing aqueous solution B, so as to form the acid containing aqueous solution including crushed matter 92.

As examples of the crushing portion 60, a biaxial crusher (for example, a biaxial rotary crusher, a biaxial differential crusher, and a biaxial shear crusher), may be mentioned, and for example, the SUMICUTTER (manufactured by Sumitomo Heavy Industries Environment Co., Ltd.), may be mentioned. The pump 63 is connected to the crushing portion 60 through the pipe 62, and draws the acid containing aqueous solution including crushed matter 92 obtained by the crushing portion 60 from the crushing portion 60, and delivers the same to the next process. Note that, the crushed matter includes materials including pulp fibers, superabsorbent polymers, materials of the collection bag A, films, nonwoven fabrics, elastic bodies, etc.

The first separation device 13 stirs the acid containing aqueous solution including crushed matter 92 obtained by the crushing device 12, and while performing the washing so as to remove dirt (excrement, etc.) from the crushed matter, separates the acid containing aqueous solution in which foreign matter is removed 93 which includes pulp fibers and superabsorbent polymers from the acid containing aqueous solution including crushed matter 92, and delivers the same to the first dust removal device 14.

As the first separation device 13, for example, a washing machine including a washing and dehydrating tank and a water tank surrounding the washing and dehydrating tank, may be mentioned. Note that, the washing and dehydrating tank (a rotating drum) is used as a washing and sieving tank (separating tank). As the above-mentioned washing machine, for example, a horizontal-type washing machine ECO-22B (manufactured by Inamoto Co., Ltd.) may be mentioned.

The first dust removal device 14 further removes foreign matter present in the acid containing aqueous solution in which foreign matter is removed 93 by a screen having a plurality of openings, so as to form the acid containing aqueous solution in which foreign matter is further removed 94 which includes pulp fibers and superabsorbent polymers. As the first dust removal device 14, for example, a screen separator (a coarse screen separator), and more specifically, for example, the Pack pulper (manufactured by Satomi Corporation), may be mentioned.

The second dust removal device 15 removes finer foreign matter from the acid containing aqueous solution in which foreign matter is further removed 94, which is delivered from the first dust removal device 14 by a screen having a plurality of openings, so as to form the acid containing aqueous solution in which foreign matter is still further removed 95 which includes pulp fibers and superabsorbent polymers. As the second dust removal device 15, for example, a screen separator, specifically, for example, Ramoscreen (manufactured by Aikawa Iron Works Co., Ltd.), may be mentioned.

The third dust removal device 16 removes still finer foreign matter from the acid containing aqueous solution in which foreign matter is still further removed 95, which is delivered from the second dust removal device 15 by centrifugation, so as to form the acid containing aqueous solution in which foreign matter is still even further removed 96 which includes pulp fibers and superabsorbent polymers. As the third dust removal device 16, for example, a cyclone separator, specifically, the ACT low concentration cleaner (manufactured by Aikawa Iron Works Co., Ltd.), may be mentioned.

In the chlorine dioxide treatment device 17, the chlorine dioxide generation material which generates chlorine dioxide by a reaction with an acid to the acid containing aqueous solution in which foreign matter is still even further removed 96, which is delivered from the third dust removal device 16, so as to generate chlorine dioxide, and by the oxidizing power of the generated chlorine dioxide, the inactivated superabsorbent polymers are subjected to the oxidative decomposition, whereby the superabsorbent polymers are removed from the pulp fibers. Subsequently, the acid containing aqueous solution which includes recycled pulp fibers 97 is discharged.

The second separation device 18 separates the recycled pulp fibers from the acid containing aqueous solution which includes recycled pulp fibers 97 which has been treated by the chlorine dioxide treatment device 17, by a screen having a plurality of openings. As the second separation device 18, for example, a screen separator may be mentioned.

Figure 3:
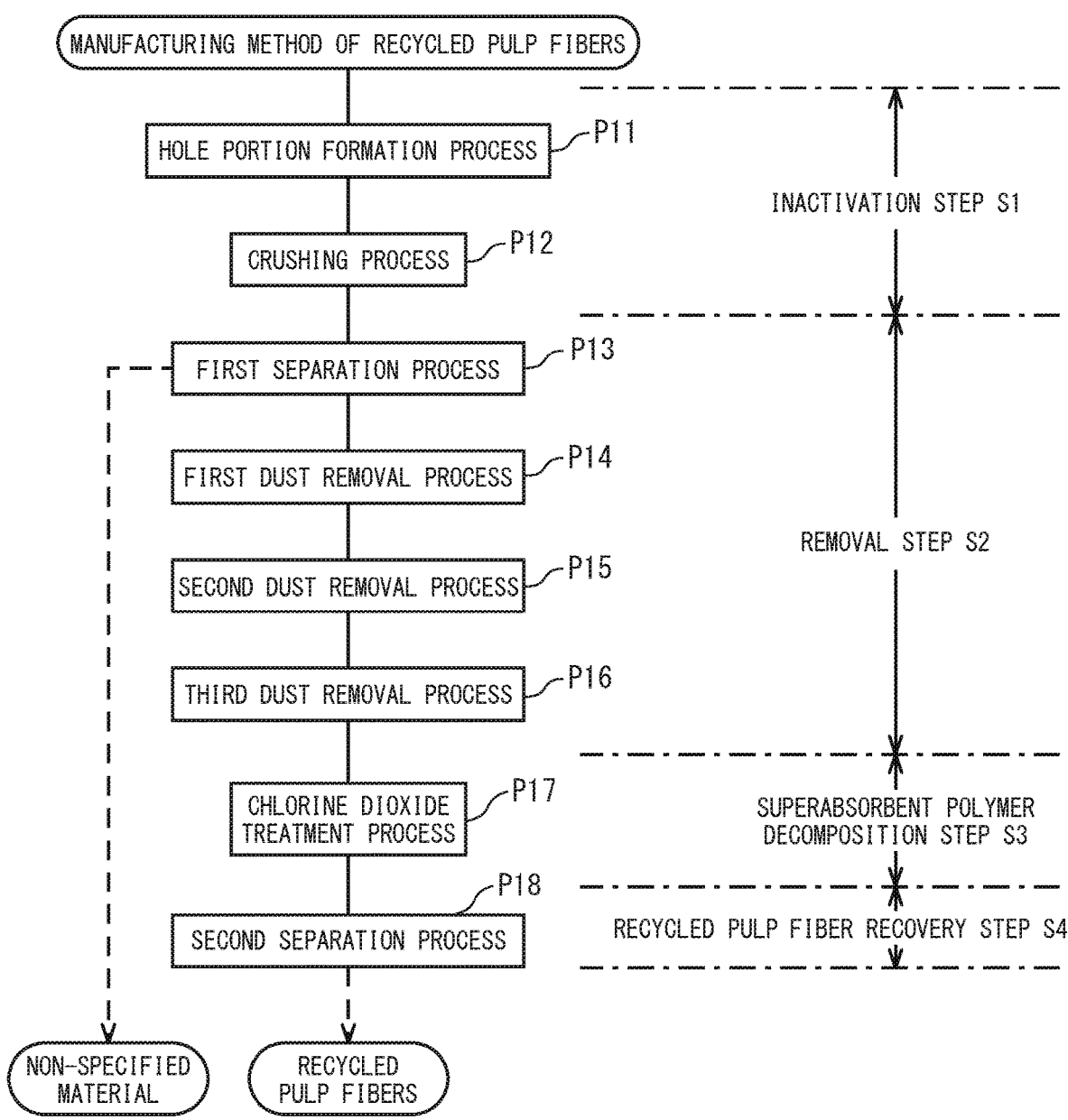
FIG. 3 is a flowchart which explains the method of manufacturing recycled pulp fibers from used sanitary products using the system 1.

FIG. 3 is a flowchart which explains the method of manufacturing recycled pulp fibers from used sanitary products using the system 1 shown in FIG. 1. The flowchart shown in FIG. 3 is an example, and does not limit the present disclosure in any way.

FIG. 3 shows the inactivation step S1, the removal step S2, the superabsorbent polymer decomposition step S3, and the recycled pulp fiber recovery step S4. The inactivation step S1 includes the hole portion formation process P11 and the crushing process P12; the removal step S2 includes the first separation process P13, the first dust removal process P14, the second dust removal process P15, and the third dust removal process P16; the superabsorbent polymer decomposition step S3 includes the chlorine dioxide treatment process P11; and the recycled pulp fiber recovery step S4 includes the second separation process P18. Hereinbelow, the detailed descriptions are given.

The hole portion formation process P11 is performed by the rupturing device 11. The collection bags A in which the used sanitary products are encapsulated are thrown into the solution tank V in which the acid containing aqueous solution B is stored, and the hole portion is formed in the surface of the collection bag A which comes into contact with the acid containing aqueous solution B. When the hole portion is formed in the collection bag A, the acid containing aqueous solution B surrounds and seals the collection bag A so that the dirt, fungi and odor, etc., of the used sanitary products inside the collection bag A are not released outside. When the acid containing aqueous solution enters inside the collection bag A from the above-mentioned hole portion, the gas inside the collection bag A exits to the outside of the collection bag A, the specific gravity of the collection bag A is to be larger than that of the acid containing aqueous solution B, and the collection bag A sinks inside the acid containing aqueous solution B. Further, the acid in the acid containing aqueous solution B inactivates the superabsorbent polymers inside the used sanitary products inside the collection bag A.

The superabsorbent polymers inside the used sanitary products are inactivated and the absorption performance thereof is reduced, whereby the superabsorbent polymers are dehydrated and the particle diameter is decreased, and thus the handling at each of the subsequent processes becomes easier and the treatment efficiency is improved. When an acid is used for the inactivation, in comparison with a case in which the superabsorbent polymers are inactivated by using lime or calcium chloride, etc., there is an advantage that ash does not remain in the pulp fibers, and further, that it is easier to adjust the degree of inactivation (the particle diameter and the degree of specific gravity, etc.) by pH.

In a case in which the sanitary product configurational material to be immersed in the acid containing aqueous solution includes a non-specified material, such as a liquid permeable sheet, a liquid impermeable sheet, etc., for example, in a case in which the sanitary products themselves are immersed in the acid containing aqueous solution as the sanitary product configurational material, it is preferable that the size, the specific gravity, etc., of the pulp fibers which configure the specified material are relatively close to the size, the specific gravity, etc., of the superabsorbent polymers. Also from such a viewpoint, in the inactivation step, it is preferable that the acid containing aqueous solution has the above-mentioned predetermined pit In the rupturing device 11 of FIG. 2, by the rotation of the stirring blade 33 around the rotation shaft (supporting shaft 32), a swirling flow is caused in the acid containing aqueous solution B, whereby the collection bag A is physically and forcibly drawn toward the bottom portion direction of the acid containing aqueous solution B (the solution tank V). Further, the collection bag A which has moved to the bottom portion comes into contact with the rupturing bag blade 41, by the rotation of the rupturing bag blade 41 around the rotation shaft (supporting shaft) 42, whereby the hole portion is formed in the collection bag A.

The crushing process S12 is performed by the crushing device 12. The collection bag with a hole portion including used sanitary products 91 moves together with the acid containing aqueous solution B from the solution tank V to the crushing device 12, and inside the crushing device 12, the used sanitary products inside the collection bag A are crushed together with the collection bag A within the acid containing aqueous solution B.

For example, in the crushing device 12 of FIG. 2, first, by the crushing portion 60, the collection bag with a hole portion including used sanitary products 91 which has been delivered from the solution tank V together with the acid containing aqueous solution B is crushed together with the collection bag A within the acid containing aqueous solution B (the in-liquid crushing process). In the crushing device 12 of FIG. 2, by the pump 63, the acid containing aqueous solution including crushed matter 92 which has been obtained at the crushing portion 60 (the in-liquid crushing process) is drawn from the crushing portion 60 (the drawing process), and is delivered to the subsequent process.

The first separation process P13 is performed by the first separation device 13. While stirring the acid containing aqueous solution including crushed matter 92 which has been obtained at the crushing device 12, and while the washing to remove dirt from the crushed matter is performed, the acid containing aqueous solution including crushed matter 92 is separated into the specified material and the acid containing aqueous solution (that is, the acid containing aqueous solution which includes pulp fibers and superabsorbent polymers), and the non-specified material of the sanitary products. At this time, in order to improve the cleaning effect, and/or to adjust pH, the acid containing aqueous solution may be added separately.

As a result, the acid containing aqueous solution in which foreign matter is removed 93 is separated from the acid containing aqueous solution including crushed matter 92 by passing through the penetration hole, so as to be delivered from the first separation device 13. On the other hand, the non-specified material which is relatively large among the acid containing aqueous solution including crushed matter 92 cannot pass through the penetration hole, and remains inside the first separation device 13 or is delivered through another route. Incidentally, those which are small among the crushed non-specified material cannot be completely separated at the first separation device 13, and are included in the acid containing aqueous solution in which foreign matter is removed 93.

When a washing machine is used as the first separation device 13, as the size of the penetration hole of the washing tank which is to function as the sieve, in a case of round holes, 5 mm to 20 mmφ may be mentioned, and in a case of holes with other shapes, the size with substantially the same area as the round hole may be mentioned.

The first dust removal process P14 is performed by first dust removal device 14. The acid containing aqueous solution in which foreign matter is removed 93 which has been delivered from the first separation device 13 is made to pass through a screen, so that the acid containing aqueous solution which includes pulp fibers and superabsorbent polymers, and the crushed non-specified material (the foreign matter) are further separated. As a result, the crushed non-specified material (the foreign matter) cannot pass through the screen so as to be separated, and the acid containing aqueous solution in which foreign matter is further removed 94 is delivered from the first dust removal device 14. On the other hand, the crushed non-specified material (the foreign matter) cannot pass through the screen, and remains inside the first dust removal device 14 or is delivered through another route. Incidentally, those which are even smaller among the crushed non-specified material cannot be completely separated at the first dust removal device 14, and are included in the acid containing aqueous solution in which foreign matter is further removed 94.

The second dust removal process P15 is performed by the second dust removal device 15, and the acid containing aqueous solution in which foreign matter is further removed 94 which has been delivered from the first dust removal device 14 is made to pass through a screen, so that the acid containing aqueous solution which includes pulp fibers and superabsorbent polymers, and the crushed non-specified material (the foreign matter) are further separated. As a result, the crushed non-specified material (the foreign matter) cannot pass through the screen so as to be separated, and the acid containing aqueous solution in which foreign matter is still further removed 95 is delivered from the second dust removal device 15. On the other hand, the crushed non-specified material (the foreign matter) cannot pass through the screen, and remains inside the second dust removal device 15 or is delivered through another route. Incidentally, those which are even smaller among the crushed non-specified material cannot be completely separated at the second dust removal device 15, and are included in the acid containing aqueous solution in which foreign matter is still further removed 95.

The third dust removal process P16 is performed by the third dust removal device 16, and the acid containing aqueous solution in which foreign matter is still further removed 95 which has been delivered from the second dust removal device 15 is subjected to a centrifugal separation inside a conical housing placed in an up-side down manner, so that the acid containing aqueous solution which includes pulp fibers and superabsorbent polymers, and the crushed non-specified material (the foreign matter) are even further separated. As a result, the acid containing aqueous solution in which foreign matter is still even further removed 96 is delivered from the upper portion of the third dust removal device 16 (the cyclone separating machine). On the other hand, the crushed non-specified material (the foreign matter), especially, heavy materials such as metal, etc., is delivered from the lower portion of third dust removal device 16 (the cyclone separating machine).

Incidentally, pH of the acid containing aqueous solution is adjusted so that the specific gravity and the size of the superabsorbent polymers and the specific gravity and the size of the pulp fibers are within a predetermined range.

The chlorine dioxide treatment process P17 is performed by the chlorine dioxide treatment device 17. The acid containing aqueous solution in which foreign matter is still even further removed 96 which has been delivered from the third dust removal device 16 is thrown into the chlorine dioxide treatment device 17, the acid containing aqueous solution in which foreign matter is still even further removed 96 is heated, and the temperature of the acid containing aqueous solution in which foreign matter is still even further removed 96 is maintained at a high temperature, for example 40° C. or higher and less than 100° C.

Subsequently, sodium chlorite is added as the chlorine dioxide generation material which generates chlorine dioxide by a reaction with an acid to the acid containing aqueous solution in which foreign matter is still even further removed 96 inside the third dust removal device 16, so as to generate chlorine dioxide, and the superabsorbent polymers are oxidized and decomposed by the generated chlorine dioxide. Since the amount of sodium chlorite and the amount of chlorine dioxide are reduced over time, sodium chlorite may be added to the acid containing aqueous solution in which foreign matter is still even further removed 96 continuously or intermittently, for example, sodium chlorite may be added every hour.

By the chlorine dioxide, the superabsorbent polymers which have been attached to the pulp fibers (for example, which have remained on the surface of the pulp fibers) change to organic matter with a low molecular weight which is soluble in an aqueous solution, so as to be removed from the pulp fibers. Further, sterilization, bleaching, and deodorization, etc., of the pulp fibers are performed by chlorine dioxide, whereby the acid containing aqueous solution which includes recycled pulp fibers 97 is formed.

The second separation process P18 is performed by the second separation device 18, and the acid containing aqueous solution which includes recycled pulp fibers 97 which has been treated by the chlorine dioxide treatment device 17 is made to pass through a screen which has a plurality of slits, so that the recycled pulp fibers and the acid containing aqueous solution are separated. The recycled pulp fibers do not pass through the screen and remain in the second separation device 18 or are delivered through another route.

EXAMPLES

Hereinbelow, the present disclosure is explained by mentioning examples, however, the present disclosure is not limited to these examples.

Example 1

Polyacrylic-based superabsorbent polymers (AQUA KEEP, manufactured by SUMITOMO SEIKA CHEMICALS CO.,LTD., which were unused) were dried at 70° C. for 24 hours, and the dry mass: $m_3$ (g) of the superabsorbent polymers was measured.

In a constant temperature and humidity chamber with the temperature: 25± 5° C. and the humidity: 65± 5% RH, the superabsorbent polymers with the initial mass: $m_0$ (g) were immersed in saline with the amount of 150 times by mass ratio for 10 minutes.

After the immersion, the mass after immersion: $m_4$ (g) of the superabsorbent polymers was measured, and the absorption magnification of saline was 86.6 (g/g) (=$m_4/m_3$).

In a constant temperature and humidity chamber with the temperature: 25± 5° C. and the humidity: 65± 5% RH, 86.6 g of the superabsorbent polymers after having been immersed in saline for 10 minutes (AQUA KEEP, manufactured by SUMITOMO SEIKA CHEMICALS CO.,LTD., which were unused, dry mass: 1.0 g) and 300 mL of deionized water were placed in a beaker, and while stirring, the content of the beaker was heated so that the temperature thereof was 80° C. Sodium nitrite: 2.0 g and glacial acetic acid: 0.4 mL for adjusting the pH of the content were added to the beaker. The content of the beaker was stirred while being retained at 80° C., and sodium nitrite: 2.0 g and glacial acetic acid: 0.4 mL were added every hour, whereby after 4 hours from the initiation of the stirring (after adding sodium nitrite: 2.0 g and glacial acetic acid: 0.4 mL×3 times), the superabsorbent polymers disappeared.

From the above, it can be understood that chlorine dioxide can decompose superabsorbent polymers. Further, it can be understood that by using chlorine dioxide, recycled pulp fibers with high quality with little superabsorbent polymers can be obtained.

Example 2

The superabsorbent polymers were decomposed in the same manner as Example 1 except for retaining the temperature of the content of the beaker at 60° C., whereby after 5 hours from the initiation of the stirring after adding sodium nitrite: 2.0 g and glacial acetic acid: 0.4 mL×4 times), the remaining rate of the superabsorbent polymers was 44 mass %.

Incidentally, the above-mentioned remaining rate was measured as follows.
(1) The content of the beaker after the test was placed in a mesh (250 mesh nylon net, manufactured by NBC Meshtec Inc.) and was hung for 5 minutes, so as to remove moisture attached to the surface thereof.
(2) The superabsorbent polymers on the mesh were dried at 70° C. for 24 hours, and the dry mass after test: $m_2$ (g) was measured.
(3) The remaining rate (mass %) was calculated based on the following formula.
The remaining rate (mass %)=100×$m_2$/1.0

Example 3

The superabsorbent polymers were decomposed in the same manner as Example 1 except for retaining the temperature of the content of the beaker at 40° C., whereby after 5 hours from the initiation of the stirring (after adding sodium nitrite: 2.0 g and glacial acetic acid: 0.4 mL×4 times), the remaining rate of the superabsorbent polymers was 68 mass %.

REFERENCE SIGNS LIST

1 system
11 rupturing device
12 crushing device
13 first separation device
14 first dust removal device
15 second dust removal device
16 third dust removal device
17 chlorine dioxide treatment device
18 second separation device
91 collection bag with a hole portion including used sanitary products
92 acid containing aqueous solution including crushed matter
93 acid containing aqueous solution in which foreign matter is removed
94 acid containing aqueous solution in which foreign matter is further removed
95 acid containing aqueous solution in which foreign matter is still further removed
96 acid containing aqueous solution in which foreign matter is still even further removed
97 acid containing aqueous solution including recycled pulp fibers
S1 inactivation step
S2 removal step
S3 superabsorbent polymer decomposition step
S4 recycled pulp fiber recovery step
P11 hole portion formation process
P12 crushing process
P13 first separation process
P14 first dust removal process
P15 second dust removal process
P16 third dust removal process
P17 chlorine dioxide treatment process
P18 second separation process

The invention claimed is:
1. A method of manufacturing recycled pulp fibers from a used sanitary product which includes pulp fibers and superabsorbent polymers, comprising:
an inactivation step of inactivating the superabsorbent polymers by immersing a sanitary product configurational material which configures the used sanitary product which includes the pulp fibers and the superabsorbent polymers with an acid group in an acid containing aqueous solution which includes an acid,
a superabsorbent polymer decomposition step of decomposing the inactivated superabsorbent polymers by adding a second chlorine dioxide generation material which generates chlorine dioxide by a reaction with an acid to the acid containing aqueous solution which has been subjected to the inactivation step, so as to generate a second chlorine dioxide and by using the generated second chlorine dioxide, and
a recycled pulp fiber recovery step of recovering the recycled pulp fibers from the acid containing aqueous solution which has been subjected to the superabsorbent polymer decomposition step, and
in the inactivation step, a first chlorine dioxide generation material which generates chlorine dioxide by a reaction with an acid is added to the acid containing aqueous solution, so as to generate a first chlorine dioxide, and the pulp fibers are sterilized by using the generated first chlorine dioxide.
2. The method according to claim 1, wherein
in the inactivation step, the first chlorine dioxide which has a concentration lower than a concentration of the second chlorine dioxide in the superabsorbent polymer decomposition step is generated.
3. The method according to claim 2, wherein
in the inactivation step, the acid containing aqueous solution is retained at a temperature of 5 to 30° C.
4. The method according to claim 2, wherein
in the superabsorbent polymer decomposition step, the acid containing aqueous solution is retained at a temperature of 40° C. or higher and lower than 100° C.
5. The method according to claim 1, wherein
the sanitary product configurational material is the used sanitary product, and
the method further comprises a removal step of removing the sanitary product configurational material except the pulp fibers and the superabsorbent polymers, after the inactivation step and before the superabsorbent polymer decomposition step.

\* \* \* \* \*